United States Patent [19]

Rundell

[11] Patent Number: 4,633,393
[45] Date of Patent: Dec. 30, 1986

[54] GENERIC KEY FOR INDEXING AND SEARCHING USER DATA IN A DIGITAL INFORMATION STORAGE AND RETRIEVAL DEVICE

[75] Inventor: John P. Rundell, Adams County, Colo.

[73] Assignee: Storage Technology Partners II, Louisville, Colo.

[21] Appl. No.: 544,328

[22] Filed: Oct. 21, 1983

[51] Int. Cl.⁴ .............................................. G06F 7/28
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,593,309 | 7/1971 | Clark et al. | 364/900 |
| 3,602,895 | 8/1971 | Loizides | 364/900 |
| 3,643,226 | 2/1972 | Loizides | 364/900 |
| 4,086,628 | 4/1978 | Woodrum | 364/200 |
| 4,358,824 | 11/1982 | Glickman | 364/200 |
| 4,399,503 | 8/1983 | Hawley | 364/200 |
| 4,476,526 | 10/1984 | Dodd | 364/200 |

*Primary Examiner*—David Y. Eng
*Attorney, Agent, or Firm*—James R. Young; Bryant R. Gold

[57] ABSTRACT

A generic key, for allowing a data use to efficiently search a set of user data recorded in blocks in an efficient method using a multiplicity of user keys. As user data blocks are built up for recording, the unique identifiers are placed in the header of the data block, recorded on the disk surface with the contents stored on the device and the platter index. The user can then sort and search the index based upon which of the multiplicity of user keys he selects.

16 Claims, 13 Drawing Figures

|  | LID KEY(19) | USER KEY 1(20) | USER KEY(21) |
|---|---|---|---|
| 1 | 00501 | 625 | 21 |
| 2 | 00401 | 030 | 71 |
| 3 | 00101 | 105 | 51 |
| 4 | 00601 | 240 | 41 |
| 5 | 00701 | 560 | 31 |
| 6 | 00402 | 035 | 72 |
| 7 | 00403 | 050 | 73 |
| 8 | 00301 | 430 | 61 |
| 9 | 00102 | 125 | 52 |
| 10 | 00202 | 440 | 62 |
| 11 | 00303 | 450 | 63 |
| 12 | 00304 | 460 | 64 |
| 13 | 00201 | 300 | 11 |
| 14 | 00103 | 145 | 53 |
| 15 | 00404 | 065 | 74 |
| 16 | 00502 | 660 | 22 |
| 17 | 00602 | 255 | 42 |
| 18 | 00702 | 595 | 32 |
| 19 | 00202 | 315 | 12 |
| 20 | 00203 | 325 | 13 |
| 21 | 00104 | 175 | 54 |
| 22 | 00406 | 090 | 76 |
| 23 | 00305 | 470 | 65 |
| 24 | 00405 | 085 | 75 |
| 25 | 00503 | 690 | 23 |
| 26 | 00603 | 265 | 43 |
| 27 | 00105 | 180 | 55 |
| 28 | 00204 | 340 | 14 |
| 29 | 00306 | 480 | 66 |
| 30 | 00205 | 360 | 15 |

*Fig. 5*

INDEX

| | | | |
|---|---|---|---|
| A | (3)<br>00101, 105, 51 | (9)<br>00102, 125, 52 | |
| | (14)<br>00103, 145, 53 | (21)<br>00104, 175, 54 | (27)<br>00105, 180, 55 |
| B | (13)<br>00201, 300, 11 | (19)<br>00203, 315, 12 | (20)<br>00203, 325, 13 |
| | (28)<br>00204, 340, 14 | (30)<br>00205, 360, 15 | |
| C | (8)<br>00301, 430, 61 | (10)<br>00302, 440, 62 | (11)<br>00303, 450, 63 |
| | (12)<br>00304, 406, 64 | (23)<br>00305, 470, 65 | (29)<br>00306, 480, 66 |
| D | (2)<br>00401, 030, 71 | (6)<br>00402, 035, 72 | (7)<br>00403, 050, 73 |
| | (15)<br>00404, 065, 74 | (24)<br>00405, 085, 75 | (22)<br>00406, 090, 76 |
| E | (1)<br>00501, 625, 21 | (16)<br>00502, 660, 22 | |
| | (25)<br>00503, 690, 23 | | |
| F | (4)<br>00601, 240, 41 | (17)<br>00602, 255, 42 | |
| | (26)<br>00603, 265, 43 | | |
| G | | (5)<br>00701, 560, 31 | |
| | | (18)<br>00702, 595, 32 | |

*Fig. 6*

☐☐☐☐☐☐☐☐☐ TARGET KEY (THE KEY TO FIND ON DISK)

☐ SELECT POINTER TABLE (WHICH POINTER TABLE TO BE SEARCHED)

☐ KEY START (WHICH POSITION IN INDEX WILL KEY TO COMPARE COME FROM)

☐☐ KEY LENGTH (HOW LONG IS KEY FROM INDEX TABLE)

| TARGET KEY | TARGET KEY | TARGET KEY |
|---|---|---|
| 0 0 3 0 3 4 5 0 6 4 | X X X X X 4 5 0 6 4 | X X X X X X X 6 4 |
| SELECT POINTER TABLE 1 | SELECT POINTER TABLE 2 | SELECT POINTER TABLE 3 |
| 1 | 2 | 3 |
| KEY START  1 | KEY START  6 | KEY START  9 |
| KEY LENGTH  1 0 | KEY LENGTH  0 5 | KEY LENGTH  0 2 |

*Fig. 9*

GENERIC KEY FOR INDEXING AND SEARCHING USER DATA IN A DIGITAL INFORMATION STORAGE AND RETRIEVAL DEVICE

BACKGROUND OF THE INVENTION

This invention relates to the field of retrieval of information stored on digital information storage disks, and in particular to an apparatus and method for rapidly and efficiently locating user data stored on an information recording disk.

With information storage devices such as magnetic tape drives, the need for extensive indexing is minimal since the data is recorded, and must be read, sequentially. However, with the development of random access information storage disks, the need for indexing methods developed, in order to find specific blocks or user information. Also, as digital data has been ever more densely written on information recording disks, the need to provide a means for rapidly and efficiently searching and recovering specific user data has become even more difficult.

The early response to the problem was in the indexing of disk data. That is, providing a short hand means, which has been generally entitled a Key, whereby user data is given a designation which uniquely identifies the larger data grouping, thereby allowing a somewhat more efficient search of the index in order to find the specific data grouping sought. Indexing has generally involved either placing some unique identifier Key in the header portion of the user data and storing that identifier in a separate memory, or by taking some unique characteristic of the user data and making that value the Key. In magnetic disks, as the data is recorded and transferred to the host, an extensive Index, indicating the platter content and location of specific data blocks, is created for that disk. This was a partial solution to the problem of data storage and efficient retrieval. An early example of this method is the IBM Count Key system.

However, as data is written more densely on the disk surface, and since indexing has taken up ever more real estate on the platter surface the need for even more efficient disk indexing systems has become evident. Users have a continuing need to rapidly access the stored data. The more extensive the Index, the longer the search time necessary to find a specific set of user data. With the data being more densely written on the disk surface, this time has increased, with a corresponding decrease in the utility of the system.

Also, the need has developed for a user to be able to search a given data base for a specific set of data based upon more than one Key indexing method. To do this, a multiple Key system is necessary, in that if the data sought could be more efficiently searched based upon a "sort" other than the means by which it is initially indexed, the search would be less inefficient and time consuming. For example, if the data were sorted and indexed with regard to social security numbers, a search that could be efficiently done by address or by age would be most difficult. The present systems in use generally have a single identifier Key and sort for the indexing method.

In more recent years, there has also been increased development in recording devices having removeable media. This has intensified the need for an efficient means of indexing data recorded on the device surface, because to efficiently access the data recorded on the disk, the disk must carry its complete Index with it, and as storage devices move toward using single platters as opposed to disk packs, the need for an efficient indexing system has become critical.

Most importantly, as optical media having its write once only capability has been developed, the prior indexing and searching schemes have become inappropriate. In magnetic disk, with its erasable capability, data can be replaced and/or rather easily re-ordered. In particular, if data has a specific sequence and new data is presented which should be inserted therein, it is relatively easy to re-record the data placing the new entry in its appropriate place. Also, if a defect in the platter surface prevents the recording of data, the data can be recorded elsewhere and a pointer recorded leading to the new location, thus allowing the host to view the data as recorded on the platter location intended. These approaches are not possible with noneraseable media. Therefore, a new method of writing data, indexing and searching such data must be developed. What is needed therefore, for all information recording disks, is a more efficient means for indexing and searching for user data that does not also use up significant platter storage capacity. Also needed is a tool which would allow the user to efficiently access ever larger volumes of data on the platter surface based upon multiple sorting and indexing schemes, without a corresponding increase in the use of platter storage capacity for such indexing. Also needed is a system which would allow a "write once only" disk to be written upon, indexed, and searched, at least as efficiently as erasable media. And finally, a system is needed which can support an Index for a device having removeable media.

BRIEF SUMMARY OF THE INVENTION

The present invention, a generic Key method and apparatus for indexing and searching user information on a digital information storage disk, provides a means for allowing a user to search a large set of user data based upon a plurality of unique identifier Keys. To efficiently record the data, related information is ordinarilly grouped together in data groupings called blocks. A generic Key is placed in the header of the user block of data to be recorded, the user having defined a set of fields of fixed length for the user key, each field having located therein a unique identifier Key for that block.

In operation, once the host central processing unit (CPU) has built up a block of user data to be recorded, the unique set of Key identifiers, together comprising the generic key, are selected and placed in the header of the user block. This information is transmitted through the device controller to the storage device where it is processed and stored on the disk. In the preferred embodiment, the user is able to specifically group data for recording certain sets of blocks on predetermined bands on the disk surface to allow for more efficient searching during retrieval operations. In the preferred embodiment, the format of the disk is comprised of 716 bands, one of which is dedicated as the Index band, the user bands each having 48 user tracks, and each track having space for the recording of a maximum of 15 user blocks of data.

As the information is recorded on the device surface, the header information is recorded on the disk Index and stored in the device random access memory. It is essential to the practice of this invention that user data blocks be recorded sequentially within a given user band, however, the bands themselves need not be recorded consecutively. The address for the Index register is the band number, the Index registers having located therein the complete set of user Keys (i.e., the complete generic Key). Once the Index has been loaded, Pointer Tables, one for each user Key, are established. The Pointer Table has located therein the Index addresses, the addresses sorted in a sequence based upon the values of the user Key that Pointer Table represents. For example, if the second five positions in a register represent user Key 1, then that Pointer Table is sorted with regard to the appropriate sequence for those Keys.

To conduct a search using the generic key, the user instructs the device as to the appropriate Key to be searched, supplies a Target Key to be located and the device goes through an indexing and searching routine in accordance with procedures set out in U.S. patent application Ser. No. 544,329, filed Oct. 21, 1983 assigned to the same assignee. Should the user decide to search the same Index based upon a second user Key, the appropriate information is sent to the appropriate registers and a search is conducted between the Pointer Table and Index, again in accordance with procedures set out in U.S. patent application Ser. No. 544,329, filed Oct, 21, 1983 assigned to the same assignee.

BRIEF DESCRIPTION OF THE DRAWINGS

FIG. 5 is a table listing a set of generic Keys, for illustration purposes the generic Key broken down into three specific Keys—the LID Key, the User Key 1 and the User Key 2.

FIG. 6 is a schematic drawing showing the platter surface with a plurality of bands having the user data recorded by proper protocal on the appropriate band.

FIG. 9a-9d are a plurality of tables illustrating the Target Key register, the Select Pointer Table register, the Key Start register, the Key Length register, and the contents of these registers when slight pointer table 1, Select Pointer Table 2, and Select Pointer Table 3 are used.

DETAILED DESCRIPTION OF THE PREFERRED EMBODIMENT

Figure 1:
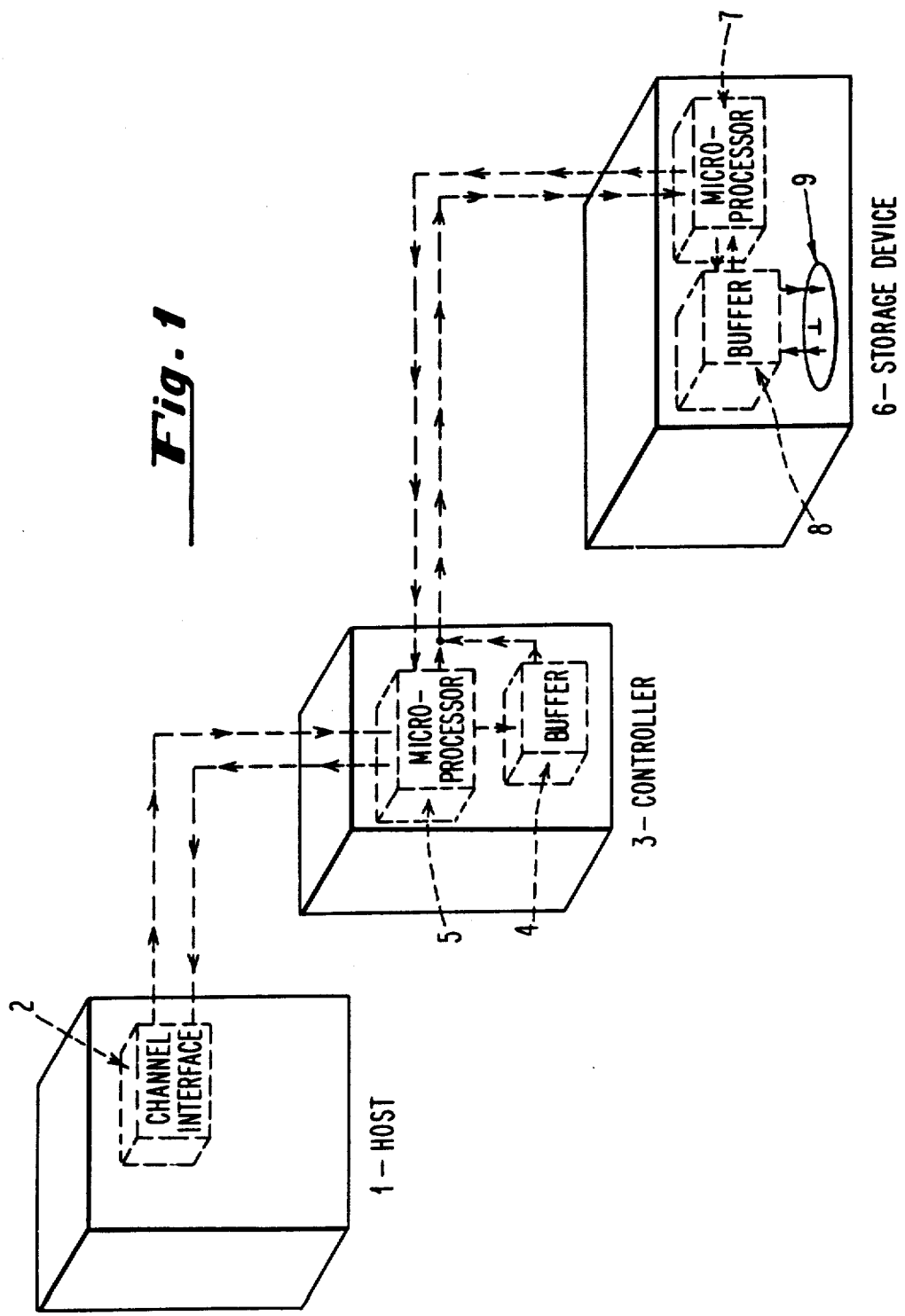
FIG. 1 is a pictorial representation of the relationship between the central processing unit host, the device controller, and the information storage device.

As shown in FIG. 1, the data to be recorded is first stored in the host central processing unit 1 in its channel interface buffer 2 where it is built up into blocks of data to be transmitted to the device controller 3. In the preferred embodiment, 7904 bytes of information comprise a single block of user data. Once built, the block or blocks are transmitted to the device controller 3 where they are stored in the buffer 4 to be transmitted by the microprocessor 5 to the storage device 6. Once transferred to the storage device 6, the data to be recorded is enabled by the device microprocessor 7 to pass into the device buffer 8 and thereafter onto the disk 9 where it is recorded.

Figure 2:
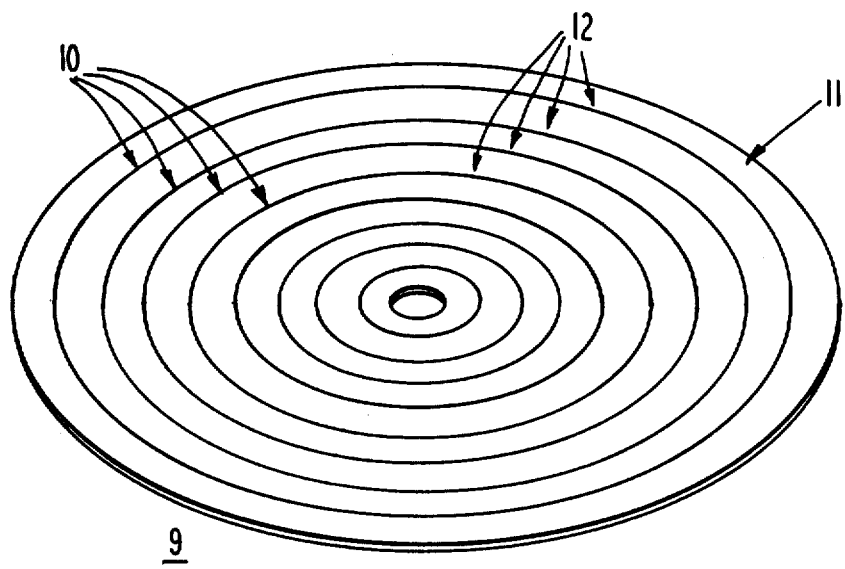
FIG. 2 is a schematic representation of an information storage disk having located thereon a plurality of bands in between which user data tracks are located.
Figure 3:
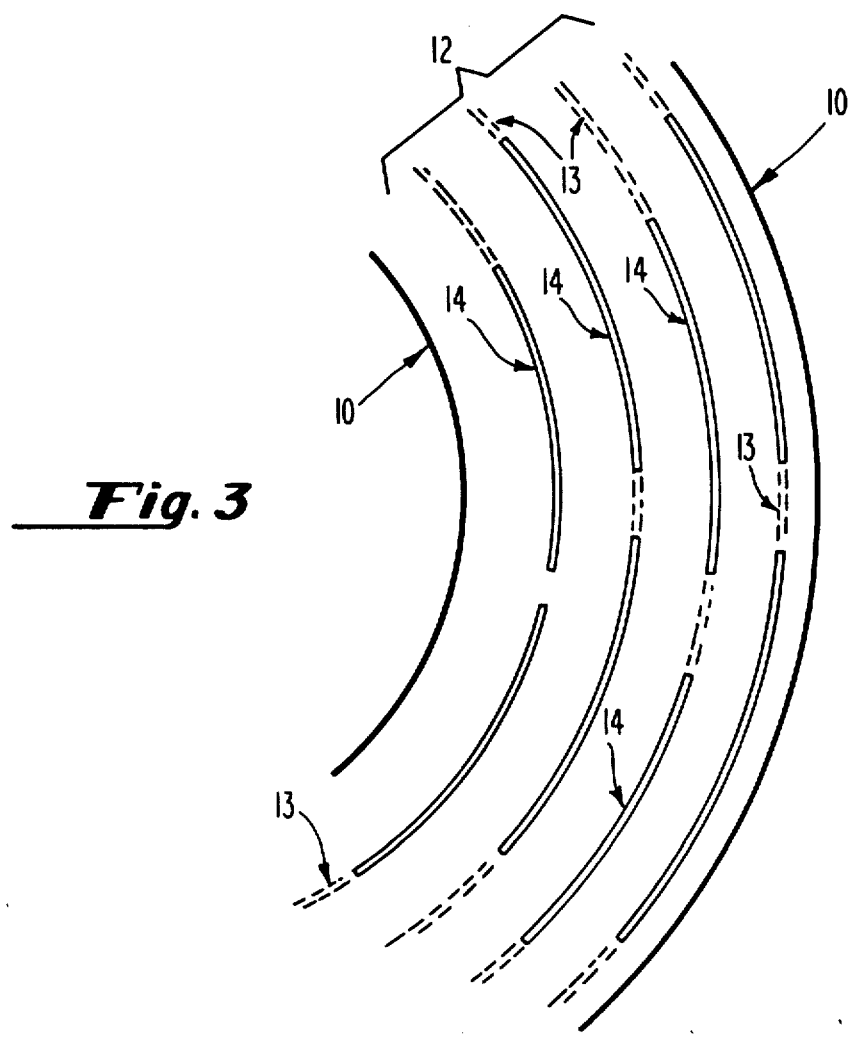
FIG. 3 is a pictorial representation depicting the format of a band on the platter, showing a plurality of user data blocks recorded in tracks.

As schematically represented in FIG. 2, the disk format is comprised of a plurality of concentric tracks 10 for the purposes of clocking and for course-fine servo seek operations, as set out in U.S. patent application Ser. No. 534,037, filed Sept. 19, 1983, assigned to the same assignee as the present disclosure. In the preferred embodiment, the disk 9 has one Index Band 11 and seven hundred fourteen user bands 12, with each user band 12 having forty eight user data tracks 13 associated therewith as represented in FIG. 3. In the preferred embodiment, each user track 13 can record a maximum of fifteen user blocks 14 of data. The disk Index Band is dedicated to the data indexing function of the device.

Because, in the preferred embodiment, the recording disk is a removeable, nonerasable media, and because with a write once only function, and because the physical location of the data on the disk surface is not known prior to actual writing, it is necessary to place the complete index entries for that disk on that disk itself. Thus, when placed in a new storage device, the contents of that disk can be read and indexing and searching functions performed.

In terms of formatting, the device protocol requires that for any given band, the data for that band be recorded by Key number in increasing order. Thus, on a given band, no block of data which has a Key value smaller than the Key value on a prior recorded block can be recorded. Therefore, on a given band, the second block recorded will always have a larger Key value than the first block, the third larger than the second and so on. However, the bands themselves need not be recorded sequentially. Also, although the normal order of recording in the device is from the outer diameter to the inner diameter, if the user so designates, data will be recorded on any designated band which is available for recording. If the new block of data presented for recording has a Key value smaller than any prior recorded Key value in that given band, the device will place the new user on a new band to which it can assign an index key less than or equal to the key of the block to be stored.

Figure 4:
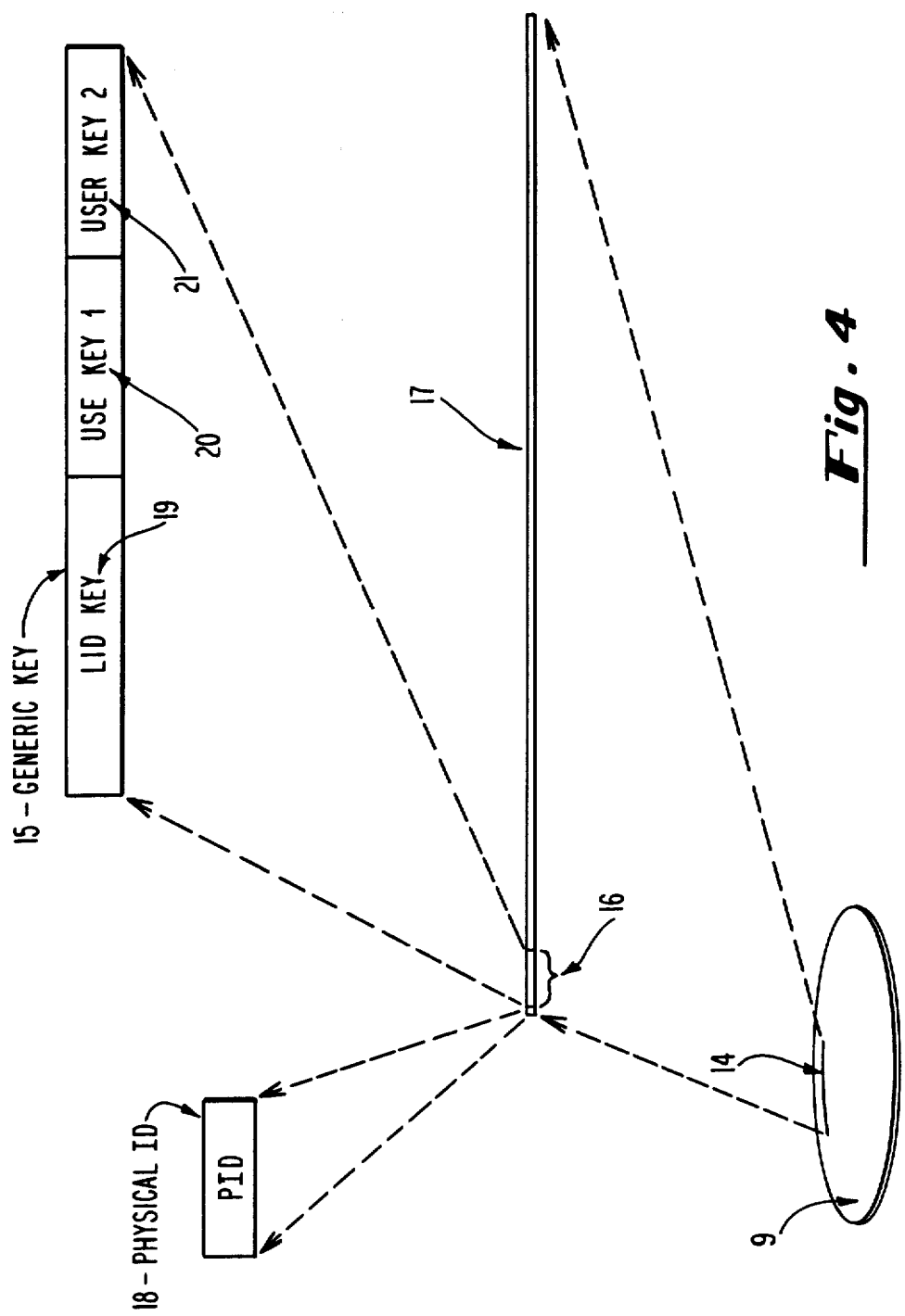
FIG. 4 is a pictorial representation of a single block exploded to show the block header having a physical ID and a user generic Key.

In operation, as shown in FIG. 4, the host 1 places a generic Key 15 in the header 16 of the user data block 17. The use of a Key in a header 16 is well known, one example being the IBM Key Count System. However, this generic Key 15 is an improvement in that a plurality of specific user Keys of varying length are placed in the generic Key 15 allowing indexing and searching to be done with regard to a plurality of user designated Keys. Once the data is transmitted to the device 6, the device 6 places a physical ID (PID) 18 at the very beginning of the user data 17 prior to recording. This physical ID (PID) 18 is necessary because in the preferred embodiment, when data is optically written on the device, it is a write once only capacity and the host 1 will not know prior to the actual write operation where the data 14 will be physically placed on the disk 9. Thus the PID 18 lists the band 12, track 13 and block 14 within the band, wherein each user block of data 17 will be physically recorded on that disk 9.

As shown in FIG. 4, once the device 6 locates the specific location on the disk 9 surface on which data will begin to be recorded, the Physical ID (PID) 18 of that location is recorded on the disk 9, followed immediately by the generic Key 15 and thereafter the user data 17. In this illustration, digital numerics and alpha letters are used for illustration purposes only. It is understood that the data be recorded is in binary numbers using, for example an ASCII encoding system.

For illustration of the complete functioning of the disclosed invention, as shown in FIG. 5, a table is listed showing the generic Key 15 values for a representative set of user data 14 to be recorded. For illustration purposes, this user data 14 is represented by three separate user Keys. The first Key is a logical ID (LID) Key 19 which is developed by the host operating system to designate which band a given block of information should be recorded in and in sequence which block in that band that data represents. (To avoid confusion the reference numerals will be omitted while referring to Key values). For example, for the first entry, LID Key value 00501 indicates the data is to be recorded on the fifth band and that it is the first block of user data to be recorded on that band. Entry 22 shows that user data having LID Key 00406 is to be recorded on the fourth band 12 and will be the 6th block of data recorded on that band 12. User Key 1 in this illustration simply represents some value in the user data which will be useful to the user in searching for that block of information, User Key 2 shows some other portion of the user data which will be useful in searching for a given block of information. The order in which the items are listed in FIG. 5 represents a random illustration of the sequence in which data could be recorded.

FIG. 6 is an illustration of the recording of the data on the disk 9 showing bands A through G in the sequence in which the data is to be recorded on the disk 9 by LID Key value. That is, item 1 is recorded, followed by item 2, item 3, item 4 and so on, until the last item 30 is recorded. Comparison of FIG. 6, showing the recording by band, with the table in FIG. 5 shows the sequence and order in which data is recorded on the disk 9.

As data is recorded, the device 6 also records, in the Index Band 11, the PID 18 and generic Key 15, if a new file is opened. In the preferred embodiment, this Index band 11 will list only the lowest Key value for a given band 12. Ordinarily, the first Key recorded on a given band 11 will be the lowest Key Value for that band 11. However, should the user decide to delete the prior recorded information on a given band 11, a new set of data can be recorded on that band 11 with a new Key number assigned, this new Key number being lower than the previously recorded (but now deleted) Key Value.

Figure 7:
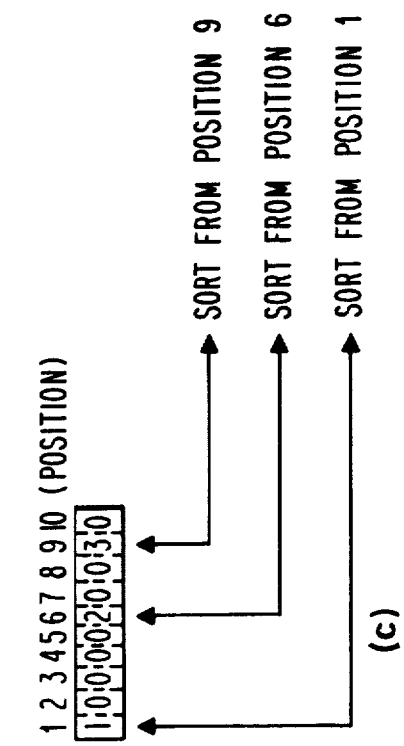
FIG. 7a-7c is a table showing the method by which the device Index register holds the appropriate Index value for each Index band.

FIG. 7a shows a listing of the Values 22 recorded on the Index band 11 for the data presented in items 1 through 30. Once the data is transferred on the Index band 11 as shown in FIG. 7b, it is read into a random access memory Index 23 in the device. In this preferred embodiment, the Index addresses 24 are the bands 12 upon which the data is recorded, with the individual registers 25 being the complete generic Key 15 value from the Index Value recorded for that band on the Index Band 11. In the preferred embodiment, the values in the index registers 25 are filled in the order in which the data is written on the disk 9. Therefore, shown in FIG. 7b the second register 25 has an address D with a contents 00401, 030, 71 and the next to last entry having an address C with a value 00301, 430, 61.

Figure 8:
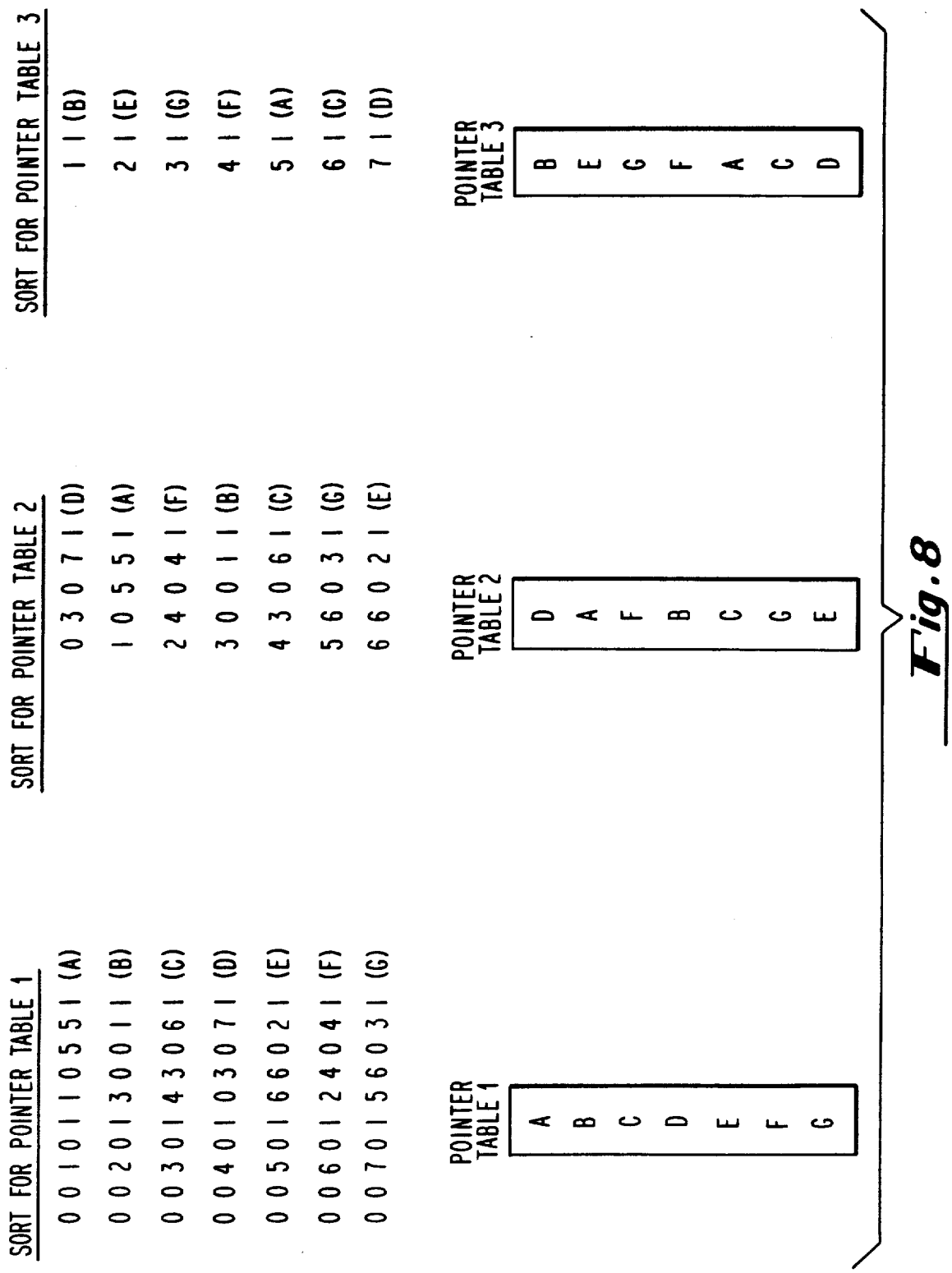
FIG. 8a-8f through B depict the sorting scheme for loading the pointer table for the LID Key, the first User Key and the second User Key.

To accomplish this, as shown in FIG. 8, a set of Pointer Tables are established which have as its register contents, the band Values sorted based upon the Key value associated with that band. For illustration purposes, in this embodiment three pointer tables are used. If a single Key were being used to identify user data, this index could be simply arranged in ascending LID sequence for indexing and searching. However, with generic Keys, said Keys providing the ability to multiply sort user data for searching and indexing, a different, improved method is available. To efficiently use the multiple Keys, additional sets of registers are employed, because it is necessary to break the index down and presort elsewhere in different registers for each set of separate Keys is required.

First an Index Order Table 26 is set up having the same number of positions in its register as there are positions in the Index Register 25. The value in each individual position in the Index Order Table 26 represents the position from which the sort for a given Key should be taken. For example, in position 1, the value number 1 indicates that for sorting for Key 1 you should start with the first position in the index order table and for Key 2 the sort should begin at position 6 in the index order table, and for Key 3 the sort should begin from position 9 in the index order table. This value is represented in FIG. 7c.

As shown in FIG. 8a, the sort for the LID Key which starts at position 1 index is listed in ascending order with the LID value 00101, 105, 51 being the lowest Key Value (recorded on band A), with 00701 560 31 (recorded on band G) being the highest. As shown in FIG. 8d, the Pointer Table 1 for the LID Key thus is arranged in sequence from A through G representing the order of the LID Key values. As shown in FIG. 7c, the sort for the second user ID starts in position 6 with the sort for pointer Table 2 thus being the first value 03071 as found in band D and the highest value being 66021 as found in band E. Therefore, as shown in FIG. 8b, Pointer Table 2 is arranged in the sequence the first value being D and the last value being E. As shown in FIG. 7c, the sort for the third Pointer Table is based on user Key 2 starting with the value in position 9 from the Index Order Table, the first value being 11 associated with band B and the last value being 71 from band D. Therefore, as shown in FIG. 8f, the first value in the pointer table three register is B with the last value in the pointer table represented as D.

Having set up the index and sorting registers, a user can now use the extended index and the rapid band searching functions to search for a given block of user data on the disk. For illustration, the search will be for item 12 on the list of user data from FIG. 5 with LID value 00304, first user Key value 460 and second user Key value 64. FIG. 9 shows the Target Key value for user data to be located and read from the disk. As shown in FIG. 9, to conduct an index search using the generic Key, a Target Key register, a Select Pointer Table register, a Key Start register, and a Key Length register are placed in the device random access memory. The Target Key register holds the value of the Target Key to be searched for comparing with the results of the index and rapid band search. The Select Pointer Table register holds the value for the particular pointer table for which the search will be conducted. The Key Start register holds the value of the position in the Index from which the first value position in the Index Register the Key Value for searching will be selected. The Key Length is the number of characters in the Key Value selected for searching.

For illustration, all three Key values for item 12 will be sought. In searching using the LID Key as shown in FIG. 9b, the Target Value is set in the Target Key register, with the Select Pointer Table set to 1, representing the search using the LID Key, the Key Start placed at 1 which is the position where the LID Key starts in the index and the Key Length having a value of 10 representing the number of positions in the entire register starting from the first position. With the registers filled as provided, the search can be initiated.

Figure 10:
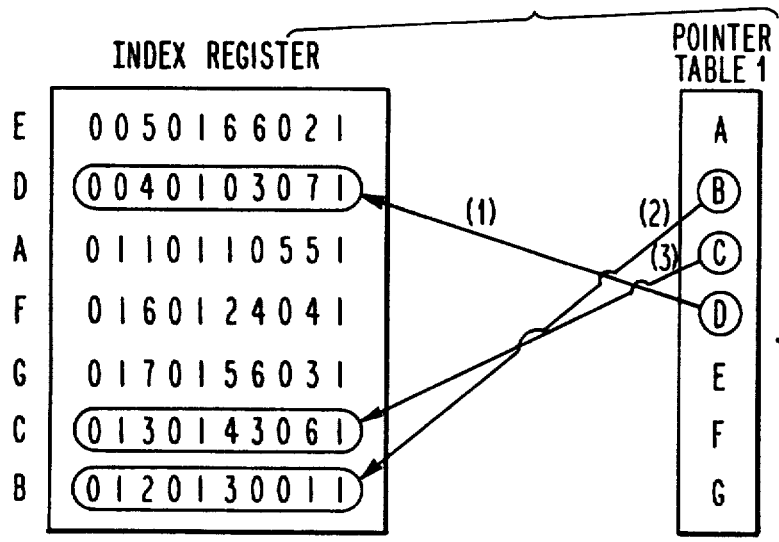
FIG. 10 is a table showing the searching sequence using the LID Key, the Index and the first Pointer Table.

In operation, the device selects the middle value from pointer table 1. In this case, as shown in FIG. 10 value D. The device then goes to address D in the Index and reads the contents of the register at that address, the contents being the Key value for band D. The device then compares the selected Key Value with the Target Key Value, using as a search criteria: finding the largest Key in the Index that is smaller than, or equal to, the Target Key value.

Using this criteria, in the preferred embodiment, a binary search is conducted in the pointer table. For example for the LID Key, the value selected is D. The contents in the index at address D are read and compared to the Target value. In this case 00401 030 71 is greater than 00303 450 64, and because a pointer table is laid out in increasing sequence, the device selects a value in the pointer table between the first entry and the middle value, thus moving upward in the pointer table. As shown in FIG. 10, the value B is selected and the contents of address B and the Index are read. In this case, 00120 130 11 is less than the Target value 00303 450 60. However, the device must see if there is a larger Key Value in the Index that is still less than the Target Key value. Therefore, the device moves downward in the pointer table, in this case to the value C. The device goes to the Index and reads the contents of the register whose address is C, finding 00301 430 61 which is less than the Target value but greater than the contents from address B. Since the contents of address D have already been searched and compared, the device knows that if the data exists, it will be located on band C.

Showing now a search using the first user Key, as shown in FIG. 9c, the Select Pointer Table is set to a value of 2, indicating that the second Pointer Table is to be used for the search. The Key Start is set to 6, thereby indicating that the search through the Index should start at position 6 for comparing with the Target value from position 6 on. The Key Length is set to a value of 05 indicating that 5 digits in the index should be read starting from position 6 in order to find the Key value to be searched.

In operation, as shown in FIG. 11 the device again selects the middle value in pointer table 2 in this case B. The device then reads the contents of the register associated with B starting at position 6 through position 10 reading 300 11 and comparing that with the Target value of 460 64. Since the selected index value is less than the Target value, the device moves downward in pointer table 2 selecting the address G, the contents being read in the index as 560 31 which is greater than the Target value. The device therefore moves upward in the table in this case to adress C, which in the index has a value of 430 61 which is less than the Target value. However, since address G has already been searched, the device knows that if the data exits it is located in band C.

Figure 12:
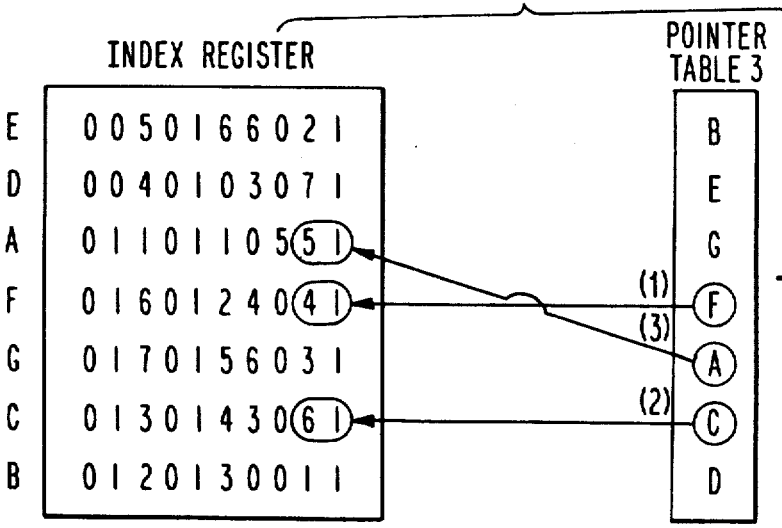
FIG. 12 is a table showing the searching sequence for User Key 2 using the Index User Key 2 and Pointer Table 3.
Figure 13:
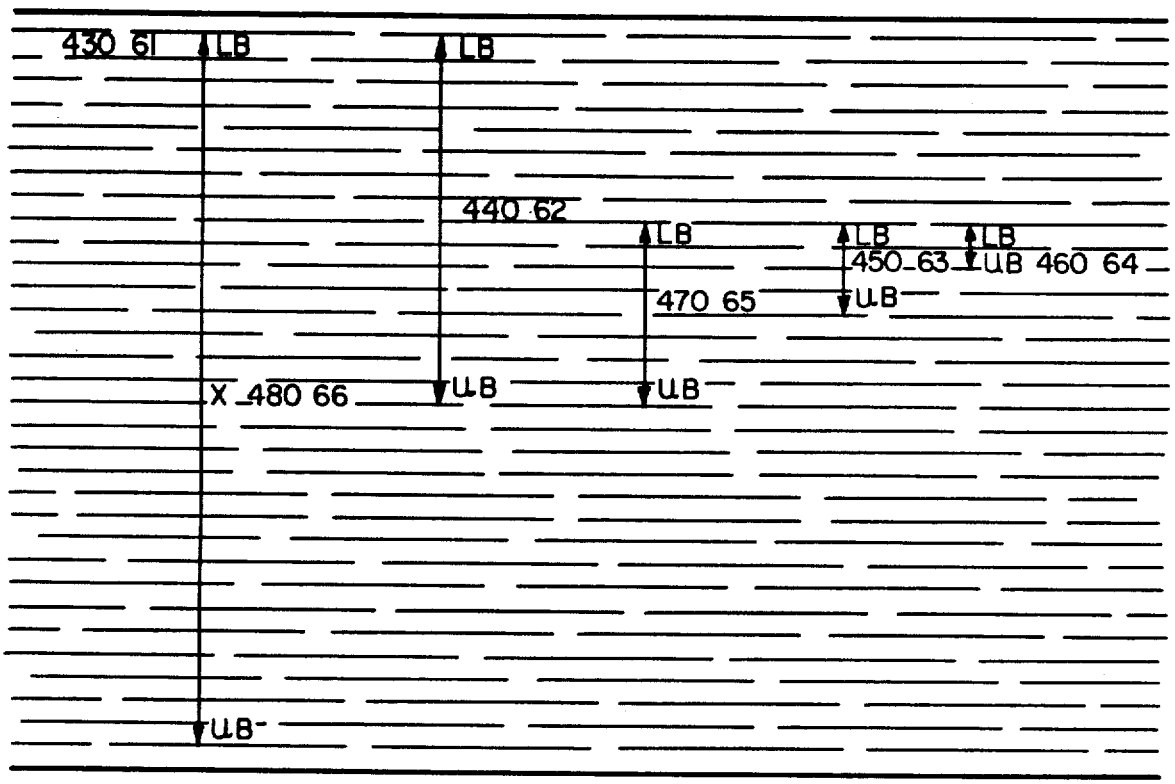
FIG. 13 is a pictorial representation of track C from the illustration showing the successive binary search locations for homing in on the specific track and block to be located.

Turning now to a search using the third user Key as shown in FIG. 9d, the Target Key register is set to 64, the Target Pointer Table set to 3, the Key Start set to 9 and the Key Length set to 02. In operation as shown in FIG. 12, the device selects the Pointer Table value F, reading the contents of the index as 41. This value is compared to the Target value of 64, this value being greater than the index value the device moves down to the Pointer Table value of C. The device then compares the contents of the index at address C comparing that to the Target Value. This value is less than the Target value, however, the device is looking for the largest Key smaller than the Target value, so the device moves up to address A, the contents of address A are read as 51 which is less than 63 but since the value in address C is larger than the value in address A, the device selects C as the largest Key smaller than the Target value, knowing that if the data exists it will reside on band C.

Therefore, regardless of which of the selected Key values used for the search, the same band is identified as the location of the data desired. The advantages of the generic Key become more readily apparent in that the user is able to search for a given data block using a plurality of different user Keys to identify said data. For example, user Key 1 could be social security numbers while user Key 2 could be city or state locations allowing the rapid index searching for a given set of data using different identification parameters.

Once the band on which the data resides has been identified, the device can initiate a rapid band search in order to find the specific block of information desired. In the preferred embodiment, it must be understood that there are 15 blocks of data per track and 48 tracks per band for a total of 720 user blocks on a given band so that reading the header information in each block individually across the entire band can be time consuming and inefficient. In operation, the device sets, as a first value, a low boundary value which is equal to 1, and a second value as a high boundary value equal to 48 (thereby covering all 48 data tracks on that band). The median is then calculated, with the device sending the read/write head to that median track.

The device then reads the header information containing the generic Key for that block, comparing the read value to the Target value. If the read value+1 is greater than the Target value, then the lower boundary value is set equal to the track number on which the read/write head is tracking. Conversely, if the read value+1 is less than or equal to the Target value, then the higher boundary value is set equal to the value of the track upon which the read/write head is tracking.

In either case, the device can then recalculate a new median, sending the read/write head to the new median track, reading the header information on any block on that track, and comparing the Key value read to the Target value. This process is continued until the device has homed in on one of two tracks, at which point the header information of each block is read from the start of the Lower Bound to the end Upper Bound track the data block being sought somewhere in between. Turning now to our example, we see that in band C, for illustration purposes, as shown in FIG. 6, 6 blocks of data have been written in band C. The device sends the device read/write head to the desired band, in this case band C.

Figure 11:
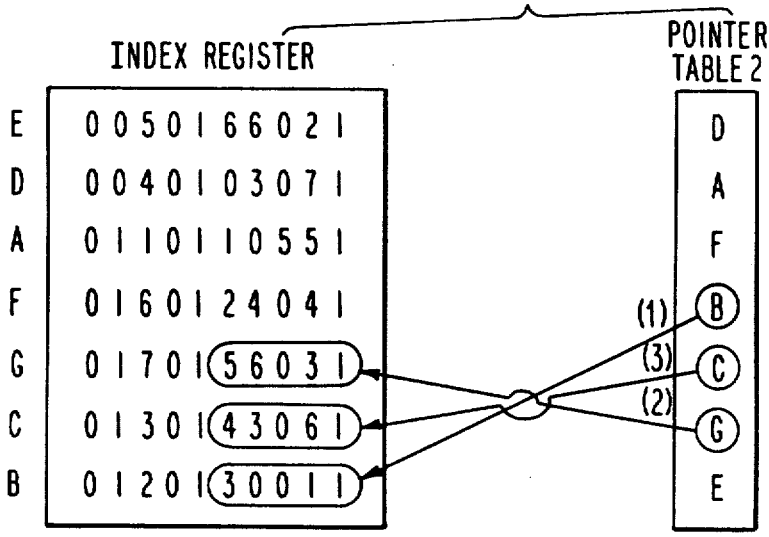
FIG. 11 is a table showing the searching sequence for the first User Key using the Index and Pointer Table number 2.

In example, as shown in FIG. 11, using data band C, for illustration purposes using the first user Key, between the upper bound and lower bound, a median is calculated and the first block being read. In this case user block numer 29 is read as 480 66 since this value is greater than the Target value, the upper bound made this new track with a median found between this new upper bound track 24 is made the upper bound where the median calculated between track 24 and track 1. Track 12 is read, the first block showing a Key value of 440 62. Since this value is less than the Target value, the device sets the lower bound equal to track 12 and finds a median between track 24 and track 12. The first block readable on track 18 is read, finding data block 470 65. Since this value is greater than the Target value, the upper bound is set to 18 and the median between track 12 and track 18 found as track 16. Track 16 is read the first block readable having a value of 450 63 this value less than the Target value. The device will then read a key from track 17. At this point, the device knows that at the location on track 18 where block Key 470 65 was read and track 16 where block 450 63 was read, the Target value, if on this disk, the device knows that the information sought if it exists, is within this two track area, thereby initiating a block by block read of each block after block 450 63 inward until the block having the lowest valued key which is greater than or equal to the Target Value is found. At this point, the device will signal the controller and thereby the host that the locate operation is complete and the data sought to be read is available for reading.

While the disclosed invention has been discussed with regard to a relatively simple binary search, it should be understood that any number of searching algorithms may be used to implement and practice the disclosed invention, and that the disclosed procedures are in no way intended to limit the scope of the appended claims.

I claim:

1. A method for indexing and searching user data recorded in block format on an information recording disk having an index band and a plurality of user bands, each of the user bands having a plurality of user data locations within which the respective blocks of user data are recorded, wherein the disk is disposed within an information recording system including a host central processing unit and a system storage device, said method comprised of the steps of:

assigning from the host central processing unit a generic Key to a block of user data to be recorded, said generic Key having a plurality of specific user Keys contained therein:

transmitting said block of user data with an associated header containing said generic Key to the system storage device for recording, said device having a means for index storage, a means for sorting said index storage means, and a means for searching said index storage means;

writing said block of user data along with its generic Key in a user data location specified by the host central processing unit;

recording on the disk in a predetermined location specified for index recording, said generic Key and the location on the band where said block of user data was recorded;

selecting one of said plurality of specific user keys in said generic Key as the basis for a search for a given block of user data identified by a target key;

transmitting to the device said target Key;

sorting said index storage means in a sequential order based upon the value of the selected one of said plurality of specific user Keys;

searching the sorted index storage means for said target key to determine the location on the disk where the specific user key associated with the user data sought is located.

2. A method of indexing and searching user data as recited in claim 1 wherein the means for index storage is a random access memory.

3. A method for indexing and searching user data as recited in claim 2 wherein the random access memory resides in the system storage device.

4. A method of indexing and searching user data as recited in claim 3 wherein the means for sorting the index is a micro-processor.

5. A method of indexing and searching user data as recited in claim 4 wherein the means for sorting said storage means resides in the system storage device.

6. A method of indexing and searching user data as recited in claim 5 wherein the mean for searching said index storage means is a micro-processor.

7. A method of indexing and searching user data as recited in claim 6 wherein the micro-processor is located in the system storage device.

8. A method for indexing and searching user data as recited in claim 7 wherein said predetermined location specified for index recording is the index band.

9. An apparatus for indexing and searching user data recorded in block format on an information recording disk having an index band and a plurality of user bands, each of the user bands having a plurality of user data locations with which the respective blocks of user data are recorded, wherein the disk is disposed within an information recording system including a host central processing unit and a system storage device, said apparatus comprised of:

means for having the system host central processing unit place a generic Key in the header of the block user data to be recorded, said generic Key having a plurality of specific user Keys contained therein;

a means for transmitting user data, with generic Key from the host central processing unit to the system storage device for recording, said device having a means for index storage, a means for sorting said index storage means, and a means for searching said index storage means;

a means for writing the user data along with its generic Key, in the location specified by the host;

a means for recording on the disk in a location specified for index recording, the generic Key and the location on the band where the user information was recorded;

a means for selecting one of the specific user keys in the generic Key as the basis for a user data search for a specific group of user data;

a means for transmitting to the device, the target Key to be searched for in the user data;

a means for sorting the means for index storage in sequential order based upon the specific user Key values selected for the search;

a means for searching the sorted index for said target key to determine the location on the disk where the specific user Key associated with the user data sought is located.

10. An apparatus for indexing and searching user data as recited in claim 9 wherein the means for index storage is a random access memory.

11. An apparatus for indexing and searching user data as recited in claim 10 wherein the random access memory resides in the system information storage device.

12. An apparatus for indexing and searching user data as recited in claim 11 wherein the means for sorting the index is a micro-processor.

13. An apparatus for indexing and searching user data as recited in claim 12 wherein said means for sorting said index storage means resides in the system storage device.

14. An apparatus for indexing and searching user data as recited in claim 13 wherein the means for searching said index storage means is a micro-processor.

15. An apparatus for indexing and searching user data as recited in claim 14 wherein the micro-processor is located in the system storage device.

16. An apparatus for indexing and searching user data as recited in claim 15 wherein said predetermined location specified for index recording is the index band.

* * * * *